United States Patent
Arnold et al.

(10) Patent No.: US 12,272,964 B2
(45) Date of Patent: Apr. 8, 2025

(54) TUNABLE ELECTRODYNAMIC WIRELESS POWER RECEIVERS

(71) Applicant: University of Florida Research Foundation, Inc., Gainesville, FL (US)

(72) Inventors: David P. Arnold, Gainesville, FL (US); Alexandra Garraud, Gainesville, FL (US); Nicolas Garraud, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 158 days.

(21) Appl. No.: 17/776,925

(22) PCT Filed: Nov. 12, 2020

(86) PCT No.: PCT/US2020/060200
§ 371 (c)(1),
(2) Date: May 13, 2022

(87) PCT Pub. No.: WO2021/101784
PCT Pub. Date: May 27, 2021

(65) Prior Publication Data
US 2022/0399755 A1    Dec. 15, 2022

Related U.S. Application Data

(60) Provisional application No. 62/936,792, filed on Nov. 18, 2019.

(51) Int. Cl.
H01F 38/14    (2006.01)
H02J 5/00    (2016.01)
(Continued)

(52) U.S. Cl.
CPC ................... H02J 50/12 (2016.02)

(58) Field of Classification Search
CPC .... H02J 50/12; H02J 50/10; H02J 5/00; H02J 50/00; H02K 35/02; H01F 38/14
(Continued)

(56) References Cited

U.S. PATENT DOCUMENTS

2011/0291490 A1    12/2011    Shi et al.
2011/0304220 A1*   12/2011    Whitehead ............. H04B 5/263
                                                              307/104
(Continued)

FOREIGN PATENT DOCUMENTS

WO    2019221871 A1    11/2019
WO    2021101784 A1    5/2021

OTHER PUBLICATIONS

ISR: Mailed Feb. 5, 2021; International Reference No. PCT/US2020/060200, pp. 1-15.

Primary Examiner — Elim Ortiz
Assistant Examiner — Xuan Ly
(74) Attorney, Agent, or Firm — Thomas | Horstemeyer, LLP (57) ABSTRACT

The present disclosure relates to systems and methods for tunable electrodynamic wireless power receivers. In some examples, a wireless power receiver electromechanically converts energy from a magnetic field using an oscillating or continuously rotating magnet. A sensing device detects an operational parameter of the receiver, and a tuning device initiates a tuning action based on the operational parameter.

20 Claims, 4 Drawing Sheets

(51) Int. Cl.
*H02J 50/10* (2016.01)
*H02J 50/12* (2016.01)

(58) Field of Classification Search
USPC .......................................................... 307/104
See application file for complete search history.

(56) References Cited

U.S. PATENT DOCUMENTS

2017/0155287 A1\* 6/2017 Arnold ................... H02K 35/02
2018/0034326 A1 2/2018 Abdolkhani

\* cited by examiner

TUNABLE ELECTRODYNAMIC WIRELESS POWER RECEIVERS

CROSS-REFERENCE TO RELATED APPLICATIONS

This application claims the benefit of and priority to the following, as a 35 U.S.C. § 371 national stage application of International Patent Application having serial number PCT/US2020/060200, with an international filing date of Nov. 12, 2020, which claims priority to and the benefit of U.S. Provisional Application No. 62/936,792, filed Nov. 18, 2019, which are hereby incorporated herein by reference in their entireties.

STATEMENT REGARDING FEDERALLY SPONSORED RESEARCH OR DEVELOPMENT

This invention was made with government support under contract number 1439644 awarded by the National Science Foundation. The government has certain rights in the invention.

BACKGROUND

Wireless power transmission can be achieved by transmitting energy using electromagnetic fields. A transmitter can create a time-varying electromagnetic field. A receiver can be affected by the time-varying electromagnetic field, and a voltage and current can be induced in a receiver circuit.

One objective for wireless power transmission is to achieve high efficiency, high power transmission to small power receivers at long distances. Technologies for wireless power transmission can vary in the distance for efficient power transfer, and can involve different types of energy such as magnetic fields, electric fields, radio waves, microwaves, acoustic waves, infrared light waves, or visible light waves. Electromagnetic wireless power transmission approaches can be generally divided into near-field approaches and far-field approaches. Near-field approaches rely on non-propagating electromagnetic fields, and the receiver is generally within a distance to the transmitter that is less than one electromagnetic wavelength. Far-field approaches rely on propagating electromagnetic fields or other energies and the receiver is generally more than several wavelengths from the transmitter.

Inductive coupling between a coil in the transmitter and a coil in the receiver is commonly used for near-field wireless power transmission. Inductive coupling is well suited for close-range transmission, but efficiency can decay quickly with the distance. Magnetic resonance inductive wireless power transmission tries to increase distance, but the system architecture is more complex because it utilizes precise tuning between the transmitter and receiver for efficient power transfer.

Additionally, there are both practical and safety concerns about the electromagnetic fields that exist between the transmitter and receiver in some wireless power transmission systems. For example, an object that sits between the transmitter and receiver can be subjected to relatively strong magnetic fields with frequencies that can range from 100's of kHz to 10 MHz. At these frequencies, unwanted eddy currents can be generated in electrically conductive objects. Further, these eddy currents can attenuate or alter the fields used for power transmission, causing inefficiencies. In addition, these eddy currents can cause undesirable or even unsafe heating in the intervening objects. One solution is to shut off the power transfer when an object comes between the transmitter and receiver, or when other anomalies are detected. However, this solution can cause inefficiency or interruption of power transfer and adds additional complexity to the wireless transmission system for detection of objects.

SUMMARY

Aspects can include a tunable wireless power transfer receiver system which can include a receiver, a sensing device, and a tuning device. The receiver converts energy from a time-varying magnetic field using electromechanical conversion. The receiver can include a magnet that rotates or oscillates based on the time-varying magnetic field to generate electrical energy in the receiver. The sensing device can detect one or more operational parameter of the receiver. The tuning device can be configured to initiate a tuning action of a control mechanism based at least in part on the one or more operational parameter of the receiver.

In some embodiments, operational parameters of the receiver can include angle of the magnet, current, voltage or power.

In some embodiments, the control mechanism can include a load controller that modifies an electrical load to perform the tuning action. The control mechanism can include a stiffness control mechanism that modifies a stiffness of a receiver suspension or a physical receiver spring to perform the tuning action.

In some embodiments, the stiffness control mechanism can include a mechanical control mechanism that applies a force to the receiver suspension or the physical receiver spring to perform the tuning action. The stiffness control mechanism can additionally or alternatively include a piezoelectric stiffness control mechanism that modifies the stiffness of the receiver suspension.

In some embodiments, the control mechanism can include a magnetic control mechanism that modifies a magnetic field to perform the tuning action. The magnetic control mechanism can modify a position of a tuning magnet to perform the tuning action. The position of a tuning magnet can be modified by at least one of: a rotation of the tuning magnet, or a displacement of the tuning magnet. The electromagnetic control mechanism can modify a magnetic field strength of the tuning magnet.

In some embodiments, the control mechanism can include a transmitter control mechanism that transmits, to a transmitter of the time-varying magnetic field, a command to modify the time-varying magnetic field to perform the tuning action.

In some embodiments, the tuning action can include a mode change that changes the receiver from a resonant mode where the magnet oscillates, to a continuously rotating mode where the magnet continuously rotates. The tuning action can additionally or alternatively involve a mode change that changes the receiver from a continuously rotating mode where the magnet continuously rotates to a resonant mode where the magnet oscillates.

In some embodiments, the sensing device comprises a mechanical sensing device. The tuning device can perform the tuning action based at least in part on a mechanical linkage.

BRIEF DESCRIPTION OF THE DRAWINGS

Many aspects of the present disclosure are better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

Systems and methods for tunable electrodynamic wireless power receivers are described herein. An electrodynamic wireless power receiver can be part of an electrodynamic wireless power transmission (EWPT) system and can be referred to as an EWPT receiver. An EWPT receiver can receive power wirelessly from an EWPT transmitter. Some EWPT receivers can be mechanically designed to resonate at a particular frequency that is transmitted by the EWPT transmitter. The mechanical resonance can be a rotation, displacement, or a combination thereof. Other EWPT receivers can operate in a continuously rotating mode. Resonating EWPT receivers can operate more reliably at longer distances. However, if a resonating EWPT receiver is moved too close to the source EWPT transmitter, the EWPT receiver can fail. For example, the moving portion of the EWPT receiver can over-rotate and destroy the device. In other cases, the over-rotation can cause mechanical non-linearities and power transfer inefficiencies. In other cases, tuning of the receiver can be used to adjust the mechanical resonance frequency. Aspects of the present disclosure discuss tunable or feedback-controlled EWPT receivers that solve these issues by tuning the EWPT receiver in response to power and angle measurements.

A controller of the tunable EWPT receiver can change a setting of a rotation control mechanism to dampen or tune the tunable EWPT receiver to decrease its rotation angle and prevent failure. The controller of the tunable EWPT receiver can change a setting to alter the resonance frequency. The controller of the tunable EWPT receiver can also change a receiver mode from resonant mode to continuously rotating mode, for example, to increase its efficiency when the EWPT transmitter is nearby or the received power signal is strong. Tunable EWPT receivers offer a solution for precise control of compact receivers useful for the Internet of Things (IoT) devices, wearables, underwater applications, and biomedical implants by preventing failures and increasing efficiency, as these devices can be inaccessible for extended periods of time.

Figure 1:
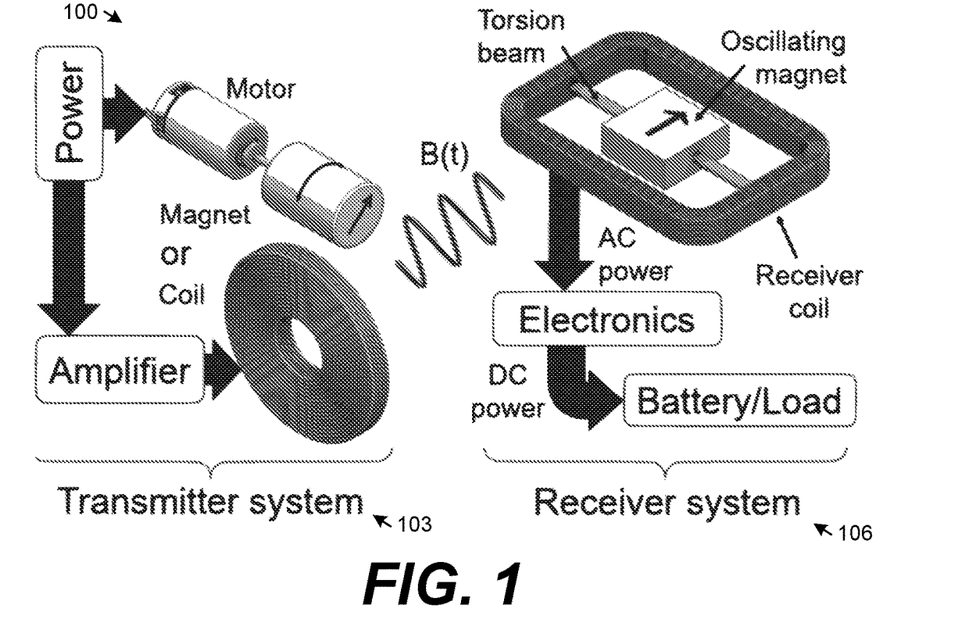
FIG. 1 is a drawing that illustrates an example system for a tunable electrodynamic wireless power transmission according to the present disclosure.

As shown in FIG. 1, an EWPT system 100 can include a transmitter system 103 and a receiver system 106. The EWPT system 100 shows an example architecture for electrodynamic wireless power transfer. A mechanically resonating magnet is sensitive to a time-varying magnetic field from the transmitter and can generate power in one or more receiver coils. An AC magnetic field (e.g., B(t)) generated by the transmitter system 103 couples via a torque with the oscillating magnet of the receiver system 106, which can torsionally oscillate about an axis (e.g., about the torsion beam). The magnet oscillation can additionally or alternatively include vertical or horizontal translation. While oscillating, the magnet can change the magnetic flux in the receiver coil and can generate an AC voltage by induction. The receiver coil can be connected to suitable power electronics to obtain a regulated DC voltage to charge a battery or directly supply a system.

Figure 2:
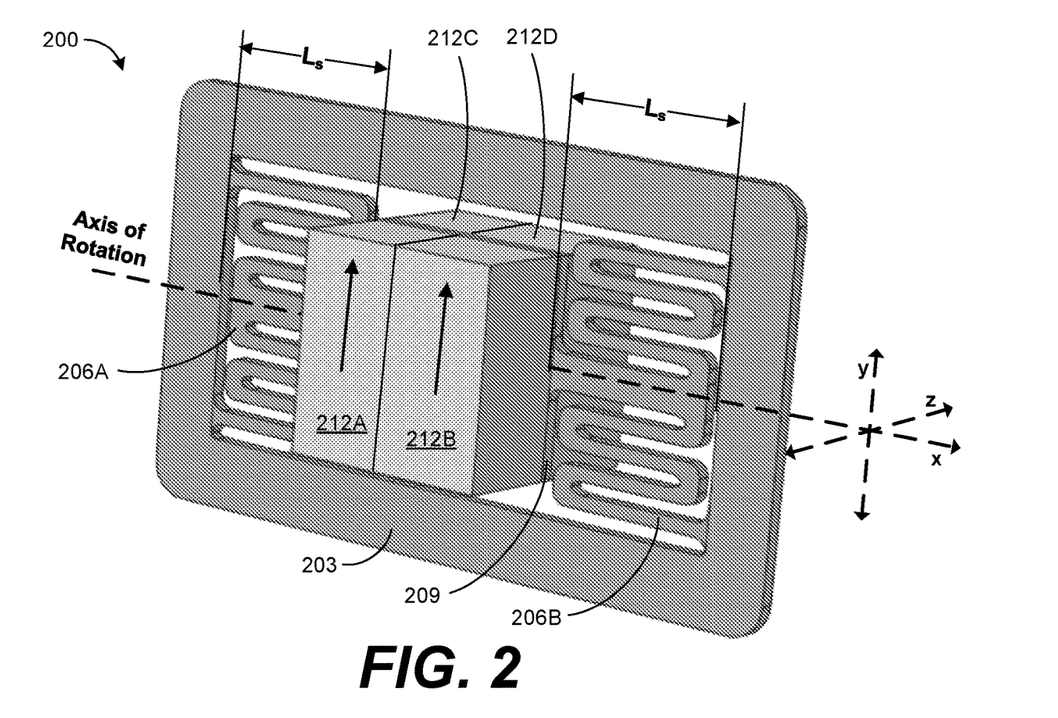
FIG. 2 is a drawing that illustrates an example structure for a tunable electrodynamic wireless power receiver according to the present disclosure.

FIG. 2 illustrates an example EWPT receiver 200. The EWPT receiver 200 can be an oscillating EWPT receiver 200 with a suspension physically designed to resonate for oscillation at a predetermined frequency. The EWPT receiver 200 includes a microfabricated structure or suspension structure. A suspension structure can be formed of a microfabricated substrate including semiconductors, metals, polymers, and other materials, and can be referred to as a microfabricated substrate suspension structure. The microfabricated structure can be planar as shown. In some cases, the microfabricated structure can include a planar or otherwise microfabricated structure of a particular material such as silicon or another material as discussed. An additive or subtractive microfabrication process can result in a planar structure that can include a single or continuous piece of a particular material. In some cases, the planar structure can include multiple separately constructed elements, or elements constructed through different process steps and attached together. The microfabricated suspension structure can include a frame 203, a suspension including suspensions 206A and 206B, and a magnet platform 209. The suspension can include a first suspension 206A and a second suspension 206B. The suspensions 206A and 206B can connect the frame 203 to the magnet platform 209. The suspensions 206A and 206B can each have a suspension length Ls. The suspension length Ls can be optimized depending on the particular shape or design of the suspension.

The magnets 212A-D (the magnets 212) can be attached to the magnet platform 209 using at least one of the following: glue, epoxy, mechanical interference, and other techniques. Magnets 212A and 212B can be attached to a first side of the magnet platform 209. Magnets 212A and 212B can alternatively be a single magnet. Magnets 212C and 212D can be attached to a second side of the magnet platform 209 opposite the first side. The magnets 212A, 212B, 212C, and 212D and can be magnetized in the direction shown. Magnets 212C and 212D can alternatively be a single magnet. Magnets 212A, 212B, 212C, and 212D can alternatively be a single magnet. The various embodiments can include any number of additional magnets 212, and further segregated versions of the magnets 212.

Each of the magnets can be magnetized in the direction shown by the arrows, in other words, orthogonal to the frame 203, for example, so that the magnetization is orthogonal to a coil around the magnets, where the coil is wrapped along (e.g. above and below) the frame 203 and a conductor of the coil is wound substantially parallel to the suspension and the frame 203. The conductor can be wound along the frame 203 and be built up on itself in the Z direction to form a coil or a spiral shape that surrounds the magnets 212. At least a portion of the conductor of the coil can be orthogonal to the magnetization of the magnets at a position or positions (e.g., at opposite sides) of minimum separation between the magnets and the coil. Because the coil surrounds the magnets, at other positions, the magnetization can be parallel or at other angles relative to the coil conductor. The direction of magnetization can also be orthogonal to an axis of rotation of the suspension.

Moreover, there can be any number of magnets 212 attached to each side of the magnet platform 209 from one magnet 212 on each side to many magnets 212 on each side of the magnet platform 209. The magnets 212 can also be formed by metallization on the magnet platform 209, and thereby be attached to the magnet platform 209. The magnets 212 can be any type of magnet, including neodymium, neodymium iron boron (NdFeB), samarium cobalt (SmCo), alnico, ceramic, or ferrite magnets.

Two receiver coils (not shown) can be attached to the frame 203. For example, a first receiver coil can be attached to a first side of the frame 203 and can encircle or surround magnets 212A and 212B in a spiral or helical shape that traces the shape of the frame 203 and builds in the z direction. A second receiver coil can be attached to a second side of the frame 203 and can encircle or surround magnets 212C and 212D in a spiral or helical shape that traces the shape of the frame 203 and builds in the z direction. Each coil can be made of metal winding, magnet wire, or enameled wire, such as copper, aluminum or other suitable material, and can include thin insulation such as polymer film insulation. The first receiver coil and second receiver coil can optionally be electrically connected in parallel or series.

The suspensions 206A and 206B can be optimized to be compact, for example, in the $L_s$ dimension about the axis of rotation. In some examples, suspensions 206A and 206B can allow only one degree of freedom around the axis of rotation, while setting the resonant frequency of the resonator through their rotational stiffness and allowing a rotation of the magnet (e.g., ±20°). The length of the suspension $L_s$ can be optimized to be as small as possible to minimize the receiver volume (i.e. increase power density) and to minimize the wiring far from the magnets where the fields are weaker (i.e. lower coil resistance leads to higher power). The resonant frequency can be tuned or designed through physical characteristics of the structure and the suspension including its shape and material characteristics. The resonant frequency can be tuned for optimal power coupling with a time-varying magnetic field of a transmitter coil. In some cases, the resonant frequency of the structure can be tuned to match a frequency of the time-varying magnetic field of a transmitter coil. For example, the resonant frequency of the structure and the frequency of the time-varying field can be designed to be within a threshold difference from each other, such as within 5%, 10%, 15%, 20%, or 25%. In other examples, the resonant frequency of the structure can be designed to be within a threshold difference, such as within 5%, 10%, 15%, 20%, or 25% from a multiple of, or a fraction of, the frequency of the time-varying field.

Magnet platform 209 can be designed to hold the magnets 212. In some cases, the magnet platform 209 can be the shape of the magnets 212 that will be attached to or held in place by the magnet platform 209. The magnets can be held in place using glue or epoxy or other methods. In some cases, the magnet platform 209 can include alignment magnets at various positions on the magnet platform 209, which can be used for magnetic alignment of magnets 212. The alignment magnets can cause the magnets 212 to self-align on the magnet platform 209 during the fabrication process.

Magnet platform 209 can also include a magnet alignment structure or structures into which the magnets 212 can be aligned by being placed or held securely within the magnet alignment structures by interference fit or mechanical interference. For example, a magnet alignment structure can include dents partially through the platform or a hole completely through the platform, which can form a frame around one or more of the magnets 212. In some cases, the dents or holes can be sufficient to hold the magnets 212 in place. In other cases, the dents or holes can be used for proper positioning while glue, epoxy, or other methods which are utilized to secure the magnets 212 in place.

The microfabricated structure, including the frame 203, suspensions 206A and 206B, and the magnet platform 209, can be formed using an additive or subtractive microfabrication process. For example, the microfabricated structure can be 3D printed in an additive process. Alternatively, the microfabricated structure can be chemical etched, such as through deep ion reactive etching (DRIE), laser machining, or other techniques in a subtractive process.

In some examples, electromechanical conversion can include a combination of one or more conversion methods, including electrodynamic and piezoelectric conversion. The microfabricated structure, or a portion of the microfabricated structure, such as the suspensions 206, can be formed using piezoelectric material or can include a piezoelectric layer or patch. When the magnets 212 oscillate, whether the oscillation is torsional or translational, the piezoelectric material, layer, or patch can convert the motion into electrical energy. This can be used additionally to or alternatively to the receiver coils.

Torsional oscillation can include a frequency as well as a maximum rotational angle as discussed below. Translational oscillation can include a frequency as well as a maximum translational distance (e.g., horizontal, vertical or a combination of both). Generally, as power generated increases, the rotational angle and translational distance can increase. These operational parameters can be utilized to prevent damage to the receiver using the concepts discussed herein. For example, when the power generated is greater than a threshold power, the translational distance is greater than a threshold distance, or the rotational angle is greater than a threshold angle, a tuning action can be performed or affected.

Figure 3A:
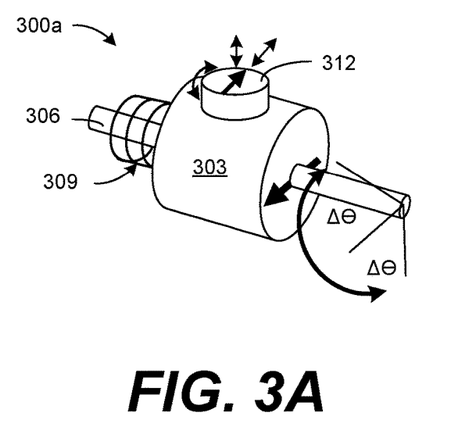
FIGS. 3A-3D are drawings that illustrate example structures for tunable electrodynamic wireless power receivers according to the present disclosure.

FIG. 3A shows example EWPT receiver 300a. The EWPT receiver 300a can include a magnetic element 303 that oscillates about an axis 306. The magnetic element 303 can oscillate when in proximity of an EWPT transmitter or another power source generating time varying electromagnetic fields. The magnetic element 303 can be referred to as a power generation magnet, as its motion can induce power in a coil or can otherwise be converted into power by the EWPT receiver 300a. The axis 306 can be attached to a spring 309 or another physical oscillation element that causes the magnetic element 303 to oscillate at a particular frequency. The EWPT receiver 300a can include a bias magnet or tuning magnet 312. As with the EWPT receiver 200, power can be induced in one or more coils around the magnetic element 303.

As shown, the tuning magnet 312 can be magnetized in a direction opposite of the magnetic element 303. Magnetic forces caused by magnetic fields between the tuning magnet 312 and the magnetic element 303 tend to cause the magnetic element 303 to align opposite of the tuning magnet 312, when no EWPT transmitter system 103 is nearby. As a result, the tuning magnet 312 can, on its own and in concert with the spring 309, resist free rotation of the magnetic element 303 about the axis 306 and cause the magnetic element 303 to oscillate at a selected frequency. In other words, the tuning magnet 312 can cause a magnetic spring action that affects the magnetic element 303 in a manner analogous to the spring 309, which can alternatively be referred to as a spring magnet. The magnetic fields that tend to align the magnetic element 303 opposite to the tuning magnet 312 can cause the magnetic spring action. This magnetic spring action can cause the magnetic element 303 to oscillate at a selected frequency.

Depending on an intensity of the time varying electromagnetic fields, the change in angle $\Delta\Theta$ of the magnetic element 303 from a resting position to its maximum rotational angle in each direction can vary. If the magnetic element 303 over rotates, then the spring 309 can be damaged or the operation of the EWPT receiver 300a can fail or can be inefficient. While the operation of the tuning magnet 312 is discussed with reference to FIGS. 3A-3D, the tuning magnet 312 can also be used to tune the EWPT receiver 200 of FIG. 2 and prevent damage to the suspension 206, according to the concepts discussed herein.

Figure 3B:
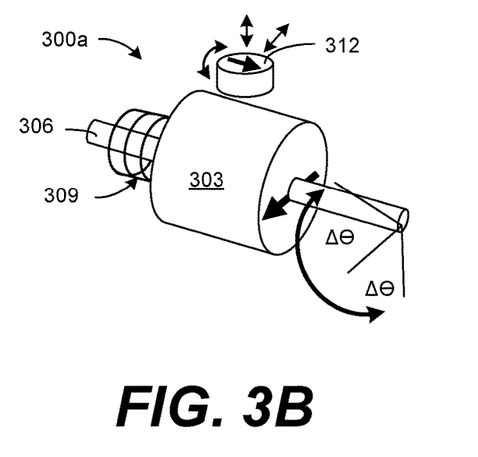

As shown in FIG. 3B, a position of the tuning magnet 312 can be changed in order to alter its effects on the rotation of the magnetic element 303 about the axis 306. For example, the tuning magnet 312 can be rotated. If the tuning magnet 312 (e.g., its magnetization) is aligned with the axis 306 and is orthogonal to the magnetization of the magnetic element 303, then the tuning magnet 312 provides no resistance or a minimal effect on the rotation of the magnetic element 303 about the axis 306. Alternatively, the position of the tuning magnet 312 can be changed by displacing, lifting, or moving it relative to the magnetic element 303. For example, the displacement of the tuning magnet 312 can be in a direction orthogonal to the axis 306 and orthogonal to the magnetization of the magnetic element 303 when at rest.

As indicated above, if the magnetic element 303 over rotates, then the spring 309 can be damaged or the operation of the EWPT receiver 300a can fail or can be inefficient. A tuning device of the EWPT receiver 300a can sense the change in angle $\Delta\Theta$ of the magnetic element 303, and can change the position of the tuning magnet 312 to provide greater resistance or lesser resistance to rotation. In order to provide lesser resistance and allow increased change in angle $\Delta\Theta$, the tuning device can cause the tuning magnet 312 to be rotated towards an alignment with the rotational axis 306, and can move the tuning magnet 312 away in a direction orthogonal to the axis 306 and orthogonal to the magnetization of the magnetic element 303 when at a neutral or resting position.

In order to provide greater resistance and decrease the change in angle $\Delta\Theta$, the tuning device can cause the tuning magnet 312 to be rotated away from an alignment with the rotational axis 306, and can move the tuning magnet 312 towards the magnetic element 303 in a direction orthogonal to the axis 306 and orthogonal to the magnetization of the magnetic element 303 when at a neutral or resting position.

Figure 3C:
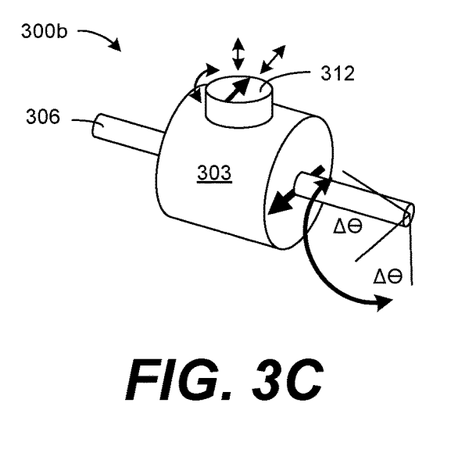

FIG. 3C shows an example EWPT receiver 300b. The EWPT receiver 300b can, like the EWPT receiver 300a, include a magnetic element 303 that oscillates about an axis 306. However, the axis 306 is not attached to a spring or physical oscillation element. Rather, the EWPT receiver 300b relies solely on the tuning magnet 312 to provide spring-like resistance. As shown in this figure, the tuning magnet 312 can be magnetized in a direction opposite of the magnetic element 303 at rest. Electromagnetic forces tend to cause the magnetic element 303 to magnetically align opposite of the tuning magnet 312 when no power source is nearby. As a result, the tuning magnet 312 can resist free rotation of the magnetic element 303 about the axis 306 and cause the magnetic element 303 to oscillate at a selected frequency when a time varying electromagnetic field is in proximity. In other words, the tuning magnet 312 can cause a magnetic spring action that affects the magnetic element 303 in a manner analogous to the spring 309, which can alternatively be referred to as a spring magnet. The magnetic fields that tend to align the magnetic element 303 opposite to the tuning magnet 312 can cause the magnetic spring action. This magnetic spring action can cause the magnetic element 303 to oscillate at a selected frequency. The tuning magnet 312 can be rotated away from the shown orientation in order to reduce its resistance to rotation and increase its oscillation frequency.

Figure 3D:
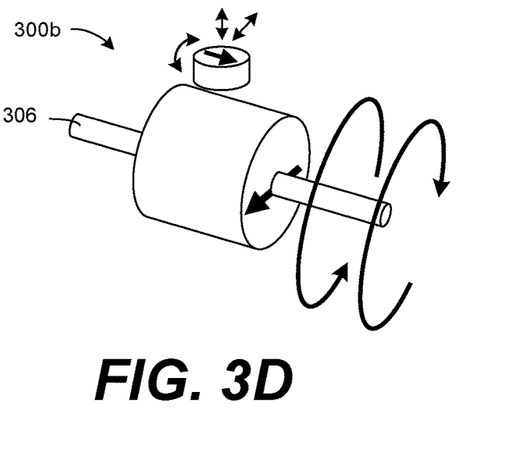

FIG. 3D shows the EWPT receiver 300b in a continuously rotating mode. Because the EWPT receiver 300b does not have a physical oscillation element, it can be changed from a resonant mode, where the magnetic element 303 can oscillate at a selected frequency according to the position of the tuning magnet 312, to a continuously rotating mode, where the magnetic element 303 can continuously rotate about the axis 306. For example, based on the power being generated by the EWPT receiver 300b and the sensed change in angle $\Delta\Theta$, a tuning device of the EWPT receiver 300b can change a position of the tuning magnet 312 to provide greater or lesser resistance to rotation, and can further change a mode of the EWPT receiver 300b between a resonant or resonating mode and a continuously rotating mode. This operates as discussed with respect to the EWPT receiver 300a, except that when the tuning magnet 312 is aligned with the rotational axis 306, the EWPT receiver 300b can be considered to be in a continuously rotating mode.

A tunable EWPT receiver can include a sensing device that detects operational parameters of the receiver, such as an orientation or angle of the magnetic element 303 or other parameters as can be understood. A tuning device can be configured to initiate a tuning action of a control mechanism based on the operational parameters of the receiver. In some cases, the sensing device can include an electronic or electromechanical sensor that provides or transmits the operational parameters to an electronic tuning device that electronically controls the various control mechanisms discussed herein. For example, by providing commands such as voltages, currents, signals, or executable instructions to the control mechanisms to implement a tuning action.

The tuning magnet 312 can be a permanent magnet, a soft ferromagnet, an electromagnet, or a combination thereof. In various implementations, the control mechanism can include an electromagnet separate from the tuning magnet 312. In some examples, a control mechanism can control the current through the coil of the electromagnet to produce or control the magnetic field provided by the tuning magnet 312. A sensor can sense power generated and/or angle of the magnetic element 303, to provide a value to a tuning device. The tuning device can control the field produced by the electromagnet to control (e.g., produce, increase, decrease, or cease to produce) the magnetic field providing the magnetic spring effect. In this way, the stiffness of the magnetic spring can be modified. Alternatively, the electromagnetic tuning magnet can be directly (or indirectly through a circuit or feed network) activated by the power generated by the magnetic element 303, such that as power produced increases, the magnetic field increases, thereby resisting oscillation as power (and maximum angle) increases.

Alternatively, the sensing device can include a mechanical sensing device that is mechanically affected by the receiver, for example, by an angle or maximum angle of the magnetic element 303. The tuning device can include a mechanical linkage between the sensing device and various control mechanisms discussed herein. The control mechanism can be configured by the mechanical linkage to tune the EWPT receiver.

Figure 4:
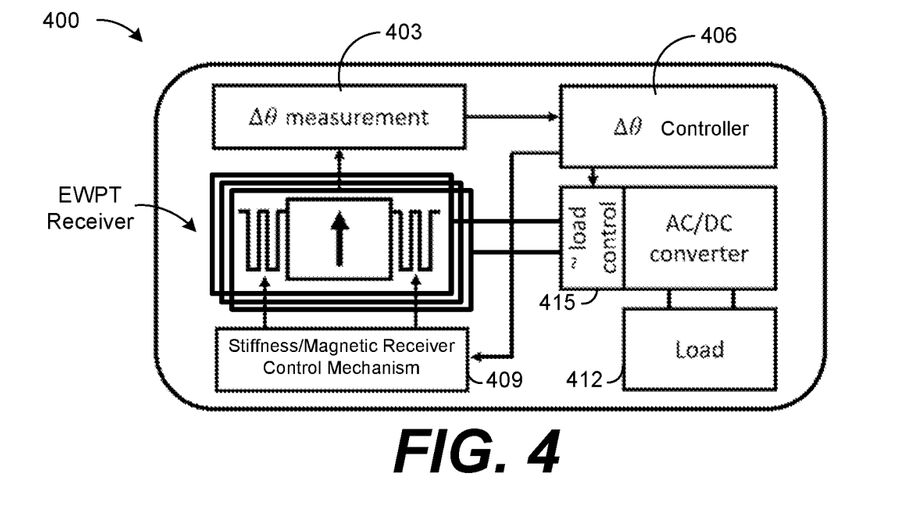
FIG. 4 is a drawing that illustrates an example tunable electrodynamic wireless power receiver for electrodynamic wireless power receivers according to the present disclosure.

FIG. 4 shows a block diagram of a tunable or feedback-controlled EWPT receiver system 400. The tunable EWPT receiver system 400 can include an EWPT receiver, a $\Delta\Theta$ measurement device 403, and a $\Delta\Theta$ tuning device or controller 406. The tuning device 406 can in some examples include an electronic controller device or computing device that operates based on computer readable executable instructions. In some cases, the $\Delta\Theta$ tuning device 406 can configure a receiver control mechanism 409 and/or configure a load 412 using a load control 415. In this example, the EWPT receiver can include a physical oscillation element such as a spring or suspension that is designed to resonate at a particular frequency. For example, the EWPT receiver of FIG. 4 can include the EWPT receiver 200, the EWPT receiver 300a, or another receiver that includes a physical oscillation element. As a result, the receiver control mechanism 409 can include a magnetic control mechanism and/or a stiffness control mechanism.

The $\Delta\Theta$ measurement device 403 can include a sensor that detects the change in angle $\Delta\Theta$ of the resonating magnetic element of the EWPT receiver. The $\Delta\Theta$ measurement device 403 can be communicatively or electronically connected to the tuning device 406. The $\Delta\Theta$ measurement device 403 can transmit or provide a $\Delta\Theta$ measurement to the tuning device 406. The tuning device 406 can tune the EWPT receiver to maintain the $\Delta\Theta$ measurement at a predetermined threshold angle. For example, if the $\Delta\Theta$ measurement is below the predetermined threshold $\Delta\Theta$, the tuning device 406 can tune the EWPT receiver to find the resonant frequency or increase the angle $\Delta\Theta$ of the oscillating magnetic element 303. However, if the $\Delta\Theta$ measurement is above the predetermined threshold $\Delta\Theta$, the tuning device 406 can tune the EWPT receiver to decrease the $\Delta\Theta$ measurement to prevent damage to the EWPT receiver.

The tuning device 406 can tune the EWPT receiver by providing control commands to the load control 415 and/or the receiver control mechanism 409. The load control 415 can modify a resistance, inductance, or capacitance value of the load 412 in order to change the resonant frequency of the spring and thereby maintain the $\Delta\Theta$ measurement below a predetermined threshold angle. The load 412 can affect the current in the coil around the magnet, which can affect the oscillation (or continuous rotation) of the magnet. For example, reducing the load 412 or shorting the load 412 can dampen the motion of the oscillating magnet of the EWPT receiver.

The tuning device 406 can tune the EWPT receiver by providing control commands to modify the stiffness, and thereby maintain the $\Delta\Theta$ measurement below a predetermined threshold angle. The receiver control mechanism 409 can operate in a number of ways to tune the EWPT receiver. For example, the receiver control mechanism 409 can include a stiffness changing mechanism. The stiffness changing mechanism can include a mechanical stiffness changing mechanism that pushes inward or pulls outward on the physical oscillation element. For example, if the physical oscillation element includes a suspension of an EWPT receiver such as the EWPT receiver 200, the stiffness changing mechanism can apply a pushing or pulling force on the suspension in the x or y directions shown in FIG. 2. Where the physical oscillation element includes a physical spring, the stiffness changing mechanism can apply a pushing or pulling force on the spring to affect its stiffness or spring constant.

The stiffness changing mechanism can also include a piezoelectric suspension stiffness changing mechanism that applies a voltage or current to the suspension, which can modify the stiffness of the suspension to maintain the $\Delta\Theta$ measurement. The stiffness changing mechanism can also include a magnetic suspension stiffness changing mechanism that activates a magnetic field that affects the suspension, which can apply a magnetic force in a z direction as shown in FIG. 2 to modify the stiffness of the suspension to maintain the $\Delta\Theta$ measurement.

The receiver control mechanism 409 can also include a tuning magnet control device that can rotate and move a tuning magnet as described with respect to FIGS. 3A-3D. The tuning device 406 can identify a change in angle $\Delta\Theta$ of the magnetic element, and can change the position of the tuning magnet to provide greater resistance or lesser resistance to rotation. In order to provide for the increased change in angle $\Delta\Theta$, the tuning device can cause the tuning magnet to be rotated towards an alignment with the rotational axis, and/or move the tuning magnet away in a direction orthogonal to the axis and orthogonal to the magnetization of the magnetic element when at a neutral or resting position. In order to provide greater resistance and decrease the change in angle $\Delta\Theta$, the tuning device 406 can provide a command to the receiver control mechanism 409 to rotate the tuning magnet away from an alignment with the rotational axis, and/or can move the tuning magnet towards the magnet. The tuning magnet control device can also change modes from a resonant or oscillating mode to a continuously rotating mode.

The receiver control mechanism 409 can also include a transmitter control device that transmits a command to the EWPT transmitter system. For example, the EWPT transmitter system can be configurable to transmit its time-varying electromagnetic waves continuously or in timed pulses with periods of activity and inactivity such as a duty cycle. In response to an over rotation, the tuning device 406 or transmitter control device can transmit a command to increase the period of inactivity or decrease the duty cycle of the time-varying electromagnetic waves. In response to an under rotation, the tuning device 406 or transmitter control device can transmit a command to increase the period of activity or increase the duty cycle of the time-varying electromagnetic waves.

Figure 5:
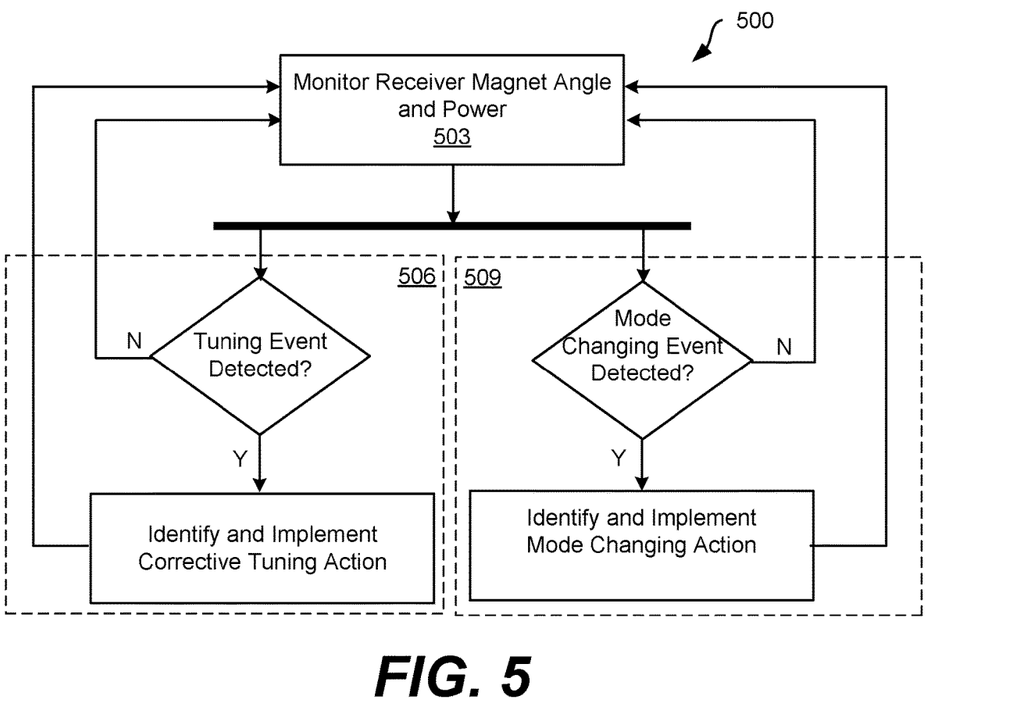
FIG. 5 is an example flowchart that illustrates the operation of a control system for an electrodynamic wireless power receiver according to the present disclosure.

FIG. 5 shows a flowchart 500 that describes functionalities performed by a tunable EWPT receiver. The flowchart 500 can refer to the operation of aspects of EWPT receiver system 400. While discussed with reference to actions performed by the tuning device or controller 406, other components can perform certain aspects of these functionalities as can be understood. The EWPT receiver system 400 and the flowchart 500 are applicable to all of the EWPT receivers discussed in the specification, including all figures.

In step 503, the tuning device 406 can monitor dynamic operational parameters of the tunable EWPT receiver. For example, the tuning device 406 can monitor the magnet angle $\Delta\Theta$, the voltage generated by the tunable EWPT receiver, the current generated by the tunable EWPT receiver and power generated by the tunable EWPT receiver. The oscillation frequency (e.g., when in oscillating mode), and the revolutions per unit time or RPM (e.g., when in rotating mode) can also be measured. For example, a sensor or measurement device can measure the magnet angle $\Delta\Theta$ and provide this information to the tuning device 406.

In step 506, the tuning device can identify whether a tuning event is detected based on the dynamic operational parameters. A tuning event can be associated with a set of one or more predetermined operational parameters, and a corrective tuning action can be triggered based on an identification that the dynamic operational parameters of the receiver match a set of one or more predetermined operational parameters. The dynamic operational parameters of the receiver can be considered to match the set of one or more predetermined operational parameters when a respective one of the dynamic operational parameters is within a predetermined threshold of a corresponding predetermined operational parameter. The set of one or more predetermined operational parameters can be a set of operational parameters that prevent damage to the EWPT receiver. For example, when the monitored or measured magnet angle $\Delta\Theta$ is greater than a predetermined threshold angle, the tuning device can identify and implement a corrective tuning action. The predetermined threshold angle can be an angle that prevents damage to the EWPT receiver, such as an angle that prevents over rotation that could cause damage to the spring 309 or the suspension(s) 206 in various different EWPT receivers discussed. The predetermined threshold angle can be an angle that prevents the magnet(s) 212 from impacting the receiver coil or the frame 203. The tuning device can provide a command to the control mechanism and/or the load control to decrease the rotation of the magnet based on the aspects described herein.

If the monitored or measured magnet angle $\Delta\Theta$ is less than a predetermined threshold, the tuning device can identify and implement another corrective tuning action. The tuning device can provide a command to the control mechanism and/or the load control to increase the rotation of the magnet based on the aspects described herein.

In step 509, the tuning device can identify whether a mode change event is detected. For example, if the monitored or measured magnet angle $\Delta\Theta$ is greater than a predetermined threshold, the tuning device can identify that the mode should be changed to a continuous rotation mode. This can result in generating more power and can prevent damage to the device. The tuning device can provide a command to the control mechanism to change the mode to a continuous rotation mode based on the aspects described herein. Also, if power, voltage, or current generated is greater than a predetermined threshold, or an external command is received from the EWPT transmitter system, the tuning device can identify that the mode should be changed to a continuous rotation mode.

Further, if the power, voltage, or current generated is too low in a continuously rotating mode, RPM is too low in a continuously rotating mode, or an external command is received from the EWPT transmitter system, the tuning device can provide a command to the control mechanism to change the mode to resonant or oscillating mode based on the aspects described herein.

The flowcharts and functionalities described can be embodied as instructions executable by a processor of a computing device that includes at least one processing system, for example, having a processor and a memory, both of which are electrically and communicatively coupled to a local interface. The local interface can be embodied as a data bus with an accompanying address/control bus or other addressing, control, and/or command lines, for data communications and addressing between the processor, the memory, and the EWPT receiver system.

In various embodiments, the memory stores data and other software or executable-code components executable by the processor. The data can include data related to the functionalities described herein, and other data. Among others, the executable-code components can include components associated with the controller and an operating system for execution by the processor. Where any component discussed herein is implemented in the form of software, any one of a number of programming languages can be employed such as, for example, C, C++, C #, Objective C, JAVA®, JAVASCRIPT®, Perl, PHP, VISUAL BASIC®, PYTHON®, RUBY, FLASH®, or other programming languages.

The memory stores software for execution by the processor. In this respect, the terms "executable" or "for execution" refer to software forms that can ultimately be run or executed by the processor, whether in source, object, machine, or other form. Examples of executable programs include, for example, a compiled program that can be translated into a machine code format and loaded into a random access portion of the memory and executed by the processor, source code that can be expressed in an object code format and loaded into a random access portion of the memory and executed by the processor, or source code that can be interpreted by another executable program to generate instructions in a random access portion of the memory and executed by the processor, etc.

In various embodiments, the memory can include both volatile and nonvolatile memory and data storage components. Volatile components are those that do not retain data values upon loss of power. Nonvolatile components are those that retain data upon a loss of power. Thus, the memory can include, a random access memory (RAM), read-only memory (ROM), magnetic or other hard disk drive, solid-state, semiconductor, universal serial bus (USB) flash drive, memory card, optical disc (e.g., compact disc (CD) or digital versatile disc (DVD)), floppy disk, magnetic tape, or any combination thereof. In addition, the RAM can include, for example, a static random access memory (SRAM), dynamic random access memory (DRAM), or magnetic random access memory (MRAM), and/or other similar memory device. The ROM can include, for example, a programmable read-only memory (PROM), erasable programmable read-only memory (EPROM), electrically erasable programmable read-only memory (EEPROM), or other similar memory device. An executable program can be stored in any portion or component of the memory.

The processor can be embodied as one or more microprocessors, one or more discrete logic circuits having logic gates for implementing various logic functions, application specific integrated circuits (ASICs) having appropriate logic gates, and/or programmable logic devices (e.g., field-programmable gate array (FPGAs), and complex programmable logic devices (CPLDs)).

If embodied in software, the controller can represent a module or group of code that includes program instructions to implement the specified logical function(s) discussed herein. The program instructions can be embodied in the form of source code that includes human-readable statements written in a programming language or machine code that includes machine instructions recognizable by a suitable execution system, such as a processor in a computer system or other system. Thus, the processor can be directed by execution of the program instructions to perform certain processes, such as those illustrated in the flowcharts described herein. In the context of the present disclosure, a non-transitory computer-readable medium can be any tangible medium that can contain, store, or maintain any logic, application, software, or executable-code component described herein for use by or in connection with an instruction execution system.

Also, one or more of the components described herein that include software or program instructions can be embodied in a non-transitory computer-readable medium for use by or in connection with an instruction execution system, such as the processor. The computer-readable medium can contain, store, and/or maintain the software or program instructions for execution by or in connection with the instruction execution system. The computer-readable medium can include a physical media, such as, magnetic, optical, semiconductor, and/or other suitable media or drives. Further, any logic or component described herein can be implemented and structured in a variety of ways. For example, one or more components described can be implemented as modules or components of a single application. Further, one or more components described herein can be executed in one computing device or by using multiple computing devices.

Although the flowcharts illustrate a specific order, it is understood that the order can differ from that which is depicted. For example, an order of execution of two or more blocks can be scrambled relative to the order shown. Also, two or more blocks shown in succession can be executed concurrently or with partial concurrence. Further, in some embodiments, one or more of the blocks can be skipped or omitted. In addition, any number of counters, state variables, warning semaphores, or messages might be added to the logical flow described herein, for purposes of enhanced utility, accounting, performance measurement, or providing troubleshooting aids, etc. Such variations, as understood for implementing the process consistent with the concepts described herein, are within the scope of the embodiments.

Features of the present disclosure can be described based on the following aspects. Aspect 1 describes a tunable wireless power transfer receiver system, comprising: a receiver that converts energy from a time-varying magnetic field using electromechanical conversion, wherein the receiver comprises a magnet that rotates or oscillates based on the time-varying magnetic field to generate electrical energy in the receiver; a sensing device that detects one or more operational parameter of the receiver; and a tuning device configured to initiate a tuning action of a control mechanism based at least in part on the one or more operational parameter of the receiver. Aspect 2 describes the tunable wireless power transfer system of aspect 1, wherein the control mechanism comprises a load controller that modifies an electrical load to perform the tuning action. Aspect 3 describes the tunable wireless power transfer system of any one of aspects 1 or 2, wherein the control mechanism comprises a stiffness control mechanism that modifies a stiffness of a receiver suspension or a physical receiver spring to perform the tuning action. Aspect 4 describes the tunable wireless power transfer system of any one of aspects 1-3, wherein the stiffness control mechanism comprises a mechanical control mechanism that applies a force to the receiver suspension or the physical receiver spring to perform the tuning action. Aspect 5 describes the tunable wireless power transfer system of any one of aspects 1-4, wherein the stiffness control mechanism comprises a piezoelectric stiffness control mechanism that modifies the stiffness of the receiver suspension. Aspect 6 describes the tunable wireless power transfer system of any one of aspects 1-5, wherein the control mechanism comprises a magnetic control mechanism that modifies a magnetic field to perform the tuning action. Aspect 7 describes the tunable wireless power transfer system of any one of aspects 1-6, wherein the magnetic control mechanism modifies a position of a tuning magnet to perform the tuning action. Aspect 8 describes the tunable wireless power transfer system of any one of aspects 1-7, wherein the position of a tuning magnet is modified by at least one of: a rotation of the tuning magnet, or a displacement of the tuning magnet. Aspect 9 describes the tunable wireless power transfer system of any one of aspects 1-8, wherein the electromagnetic control mechanism modifies a magnetic field strength of the tuning magnet. Aspect 10 describes the tunable wireless power transfer system of any one of aspects 1-9, wherein the control mechanism comprises a transmitter control mechanism that transmits, to a transmitter of the time-varying magnetic field, a command to modify the time-varying magnetic field to perform the tuning action. Aspect 11 describes the tunable wireless power transfer system of any one of aspects 1-10, wherein the tuning action comprises a mode change that changes the receiver from a resonant mode where the magnet oscillates to a continuously rotating mode where the magnet continuously rotates. Aspect 12 describes the tunable wireless power transfer system of any one of aspects 1-11, wherein the tuning action comprises a mode change that changes the receiver from a continuously rotating mode where the magnet continuously rotates to a resonant mode where the magnet oscillates. Aspect 13 describes the tunable wireless power transfer system of any one of aspects 1-12, wherein the one or more operational parameter of the receiver comprises angle of the magnet, current, voltage or power. Aspect 14 describes the tunable wireless power transfer system of any one of aspects 1-13, wherein the sensing device comprises a mechanical sensing device. Aspect 15 describes the tunable wireless power transfer system of any one of aspects 1-14, wherein the tuning device performs the tuning action based at least in part on a mechanical linkage.

Although embodiments have been described herein in detail, the descriptions are by way of example. The features of the embodiments described herein are representative and, in alternative embodiments, certain features and elements may be added or omitted. While features of the embodiments can be described with respect to a particular figure, it is understood that the features of the embodiments described with respect to one figure can also be utilized in conjunction with features of the embodiments described with respect to the other figures. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Therefore, the following is claimed:

1. A tunable wireless power transfer receiver system, comprising:
   a receiver that converts energy from a time-varying magnetic field using electromechanical conversion, wherein the receiver comprises a magnet that rotates or oscillates based on the time-varying magnetic field to generate electrical energy in the receiver;
   a sensing device that detects one or more operational parameter of the receiver; and
   a tuning device of the receiver comprising: a tuning magnet that is part of the receiver, wherein the tuning magnet is positioned with a particular orientation and at a particular distance relative to the magnet of the receiver to provide a tuning action of a control mechanism, the tuning magnet being magnetized in a direction opposite of the magnet, wherein the tuning action is initiated based at least in part on the one or more operational parameter of the receiver.

2. The tunable wireless power transfer receiver system of claim 1, wherein the control mechanism comprises a load controller that modifies an electrical load to perform the tuning action.

3. The tunable wireless power transfer receiver system of claim 1, wherein the control mechanism comprises a stiffness control mechanism that modifies a stiffness of a receiver suspension or a physical receiver spring to perform the tuning action.

4. The tunable wireless power transfer receiver system of claim 3, wherein the stiffness control mechanism comprises a mechanical control mechanism that applies a force to the receiver suspension or the physical receiver spring to perform the tuning action.

5. The tunable wireless power transfer receiver system of claim 3, wherein the stiffness control mechanism comprises a piezoelectric stiffness control mechanism that modifies the stiffness of the receiver suspension.

6. The tunable wireless power transfer receiver system of claim 1, wherein the control mechanism comprises a magnetic control mechanism that modifies a magnetic field to perform the tuning action.

7. The tunable wireless power transfer receiver system of claim 6, wherein the magnetic control mechanism modifies a position of the tuning magnet to perform the tuning action.

8. The tunable wireless power transfer receiver system of claim 6, wherein an electromagnetic control mechanism modifies a magnetic field strength of tuning magnet.

9. The tunable wireless power transfer receiver system of claim 1, wherein the control mechanism comprises a transmitter control mechanism that transmits, to a transmitter of the time-varying magnetic field, a command to modify the time-varying magnetic field to perform the tuning action.

10. The tunable wireless power transfer receiver system of claim 1, wherein the tuning action comprises a mode change that changes the receiver from a resonant mode where the magnet oscillates to a continuously rotating mode where the magnet continuously rotates.

11. The tunable wireless power transfer receiver system of claim 1, wherein the tuning action comprises a mode change that changes the receiver from a continuously rotating mode where the magnet continuously rotates to a resonant mode where the magnet oscillates.

12. The tunable wireless power transfer receiver system of claim 1, wherein the one or more operational parameter of the receiver comprises angle of the magnet, current, voltage or power.

13. The tunable wireless power transfer receiver system of claim 1, wherein the sensing device comprises a mechanical sensing device.

14. The tunable wireless power transfer receiver system of claim 4, wherein the tuning device performs the tuning action based at least in part on a mechanical linkage.

15. A method, comprising:
converting, using a receiver device, energy from a time-varying magnetic field using electromechanical conversion, wherein the receiver comprises a magnet that rotates or oscillates based on the time-varying magnetic field to generate electrical energy in the receiver;
detecting, using a sensing device, one or more operational parameter of the receiver; and
initiating, using a tuning device of the receiver device, a tuning action of a control mechanism based at least in part on the one or more operational parameter of the receiver, wherein the tuning device comprises a tuning magnet positioned relative to the magnet of the receiver to provide the tuning action, the tuning magnet being magnetized in a direction opposite of the magnet.

16. The method of claim 15, wherein the magnetic control mechanism modifies a position of the tuning magnet of the receiver to perform the tuning action.

17. The method of claim 16, wherein the position of the tuning magnet of the receiver is modified by at least one of: a rotation of the tuning magnet, or a displacement of the tuning magnet relative to the magnet of the receiver.

18. A system, comprising:
a receiver that converts energy from a time-varying magnetic field using electromechanical conversion, wherein the receiver comprises a magnet that rotates or oscillates based on the time-varying magnetic field to generate electrical energy in the receiver; and
a tuning device of the receiver device, the tuning device being configured to initiate a tuning action of a control mechanism based at least in part on one or more operational parameter of the receiver, wherein the tuning device comprises a tuning magnet positioned relative to the magnet of the receiver to provide the tuning action, the tuning magnet being magnetized in a direction opposite of the magnet.

19. The system of claim 18, wherein the magnetic control mechanism performs the tuning action based at least in part on at least one of: a rotation of the tuning magnet, or a displacement of the tuning magnet relative to the magnet of the receiver.

20. The system of claim 18, wherein the tuning magnet is magnetized in the direction opposite of the magnet in order to cause the magnet to oscillate at a selected frequency.

* * * * *